US011308596B2

(12) United States Patent
Ko et al.

(10) Patent No.: US 11,308,596 B2
(45) Date of Patent: Apr. 19, 2022

(54) DISPLAY SYSTEM FOR SENSING DEFECT ON LARGE-SIZE DISPLAY

(71) Applicant: Samsung Electronics Co., Ltd., Suwon-si (KR)

(72) Inventors: Changgun Ko, Suwon-si (KR); Anupam Khandelwal, Suwon-si (KR); Hyunsuk Min, Suwon-si (KR); Jihun Yoon, Suwon-si (KR); Chaejin Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 85 days.

(21) Appl. No.: 16/774,560

(22) Filed: Jan. 28, 2020

(65) Prior Publication Data

US 2020/0258209 A1  Aug. 13, 2020

(30) Foreign Application Priority Data

Feb. 12, 2019  (KR) .................. 10-2019-0015919

(51) Int. Cl.
*G06T 7/00* (2017.01)
*G06F 3/14* (2006.01)

(52) U.S. Cl.
CPC .......... *G06T 7/0002* (2013.01); *G06F 3/1446* (2013.01); *G06T 2207/20084* (2013.01); *G06T 2207/30121* (2013.01)

(58) Field of Classification Search
CPC ......... G06T 7/0002; G06T 2207/30121; G06T 7/001; G06T 2207/20084; G06F 3/1446; G09G 3/006; G09G 2300/026

USPC ........................................................ 382/156
See application file for complete search history.

(56) References Cited

U.S. PATENT DOCUMENTS

| 5,175,772 A | 12/1992 | Kahn et al. |
| 5,351,201 A | 9/1994 | Harshbarger, Jr. et al. |
| 9,888,337 B1* | 2/2018 | Zalewski ............. H02N 11/002 |
| 2001/0053299 A1* | 12/2001 | Matsunoshita .... H04N 1/00883 399/366 |

(Continued)

FOREIGN PATENT DOCUMENTS

| JP | 2018-5640 | 1/2018 |
| KR | 10-2005-0112573 | 12/2005 |

(Continued)

OTHER PUBLICATIONS

International Search Report dated May 25, 2020 in International Patent Application No. PCT/KR2020/001248.

(Continued)

*Primary Examiner* — Sheela C Chawan
(74) *Attorney, Agent, or Firm* — Staas & Halsey LLP

(57) ABSTRACT

A display system includes a display device including a plurality of displays to output first content received from a first server, a second server to receive the first content from the first server and to store a plurality of error patterns which is able to occur in the first content, and a photographing device to transmit second content obtained by photographing the display device to the second server. The second server displays whether a defect is present on the display device, by comparing the second content with the plurality of error patterns, when the second content is received from the photographing device.

16 Claims, 8 Drawing Sheets

(56) References Cited

U.S. PATENT DOCUMENTS

| | | | |
|---|---|---|---|
| 2002/0054317 A1* | 5/2002 | Matsunoshita | H04N 1/00838 358/1.14 |
| 2002/0190972 A1 | 12/2002 | Ven de Van | |
| 2006/0143307 A1* | 6/2006 | Codignotto | H04L 67/20 709/246 |
| 2006/0171340 A1* | 8/2006 | Maeda | H04L 69/329 370/310 |
| 2011/0302461 A1 | 12/2011 | Goertier et al. | |
| 2013/0312022 A1* | 11/2013 | Yoon | H04N 21/44204 725/14 |
| 2014/0152786 A1* | 6/2014 | Nicholson | H04N 21/44008 348/61 |
| 2016/0091883 A1* | 3/2016 | Fujiwara | G05B 19/058 700/3 |
| 2016/0198151 A1 | 7/2016 | Schmid | |
| 2018/0129551 A1 | 5/2018 | Lee et al. | |

FOREIGN PATENT DOCUMENTS

| | | |
|---|---|---|
| KR | 10-2010-0091763 | 8/2010 |
| KR | 10-2018-0053465 | 5/2018 |
| WO | 2014/042473 | 3/2014 |
| WO | 2015/018942 A1 | 2/2015 |

OTHER PUBLICATIONS

Extended European Search Report dated Jan. 5, 2022 from European Application No. 20754875.1.

* cited by examiner

DISPLAY SYSTEM FOR SENSING DEFECT ON LARGE-SIZE DISPLAY

CROSS-REFERENCE TO RELATED APPLICATIONS

This application is based on and claims priority under 35 U.S.C. § 119 to Korean Patent Application No. 10-2019-0015919, filed on Feb. 12, 2019, in the Korean Intellectual Property Office, the disclosure of which is incorporated by reference herein its entirety.

BACKGROUND

1. Field

The disclosure relates to a technology to sense a defect on a large-size display.

2. Description of the Related Art

As a technology to produce a large-size display, (e.g., an electric signboard) has developed, the number of large-size displays installed in stadiums, building rooftops, or the like has increased. Visitors or citizens may naturally watch commercials through large-size displays installed on stadiums or building rooftops and commercial providers may benefit from commercials. In addition, visitors may watch the game through a large-size display, and stadium operators may create operating profits from admission fees.

The above information is presented as background information only to assist with an understanding of the disclosure. No determination has been made, and no assertion is made, as to whether any of the above might be applicable as prior art with regard to the disclosure.

SUMMARY

However, the display system may erroneously recognize content as being output through the large-size display, even though the content is not actually output because of identifying the defect on the large-size display based on metadata or log-on information. For example, the display system may erroneously recognize the content as being output even though the content is not output because the large-size display is broken. Accordingly, visitors or citizens may not watch normal content and the commercial effect to be obtained by the commercial provider may be reduced.

Aspects of the disclosure are to address at least the above-mentioned problems and/or disadvantages and to provide at least the advantages described below. Accordingly, an aspect of the disclosure is to provide a display system device to solve the above problems and to resolve the issues raised herein.

In accordance with an aspect of the disclosure, a display system includes a display device including a plurality of displays to output first content received from a first server, a second server to receive the first content from the first server and to store a plurality of error patterns which is able to occur in the first content, and a photographing device to transmit second content obtained by photographing the display device to the second server. The second server displays whether a defect is present on the display device, by comparing the second content with the plurality of error patterns, when the second content is received from the photographing device.

In accordance with another aspect of the disclosure, a server includes a display, a communication circuit to receive first content from an external server, a processor to generate a plurality of error patterns which are able to be generated in the first content, and a memory to store the plurality of error patterns. The processor determines whether a defect is present on the display device, by comparing second content, which is obtained as an external photographing device photographs an external display device, with the plurality of error patterns, when the communication circuit receives the second content from the external photographing device, and displays the determination result through the display.

In accordance with another aspect of the disclosure, a method for detecting a defect on a display device, includes receiving first content from a server, generating a plurality of error patterns which are able to be caused in the first content, and determining whether the defect is present on the display device by comparing second content with the plurality of error patterns, and displays the determination result.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
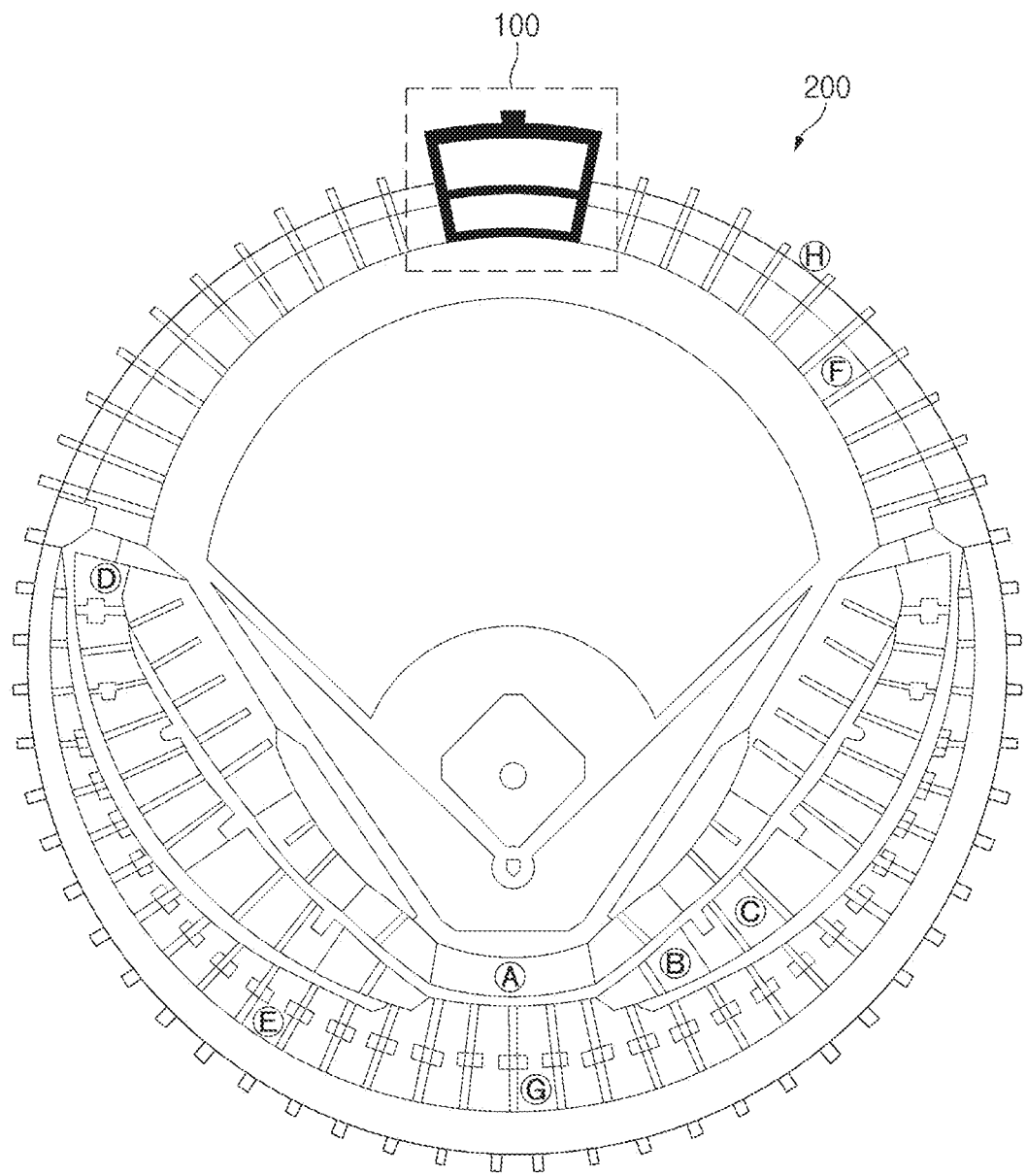
FIG. 1 illustrates an operating environment of a display system, according to an embodiment.

Hereinafter, various embodiments of the disclosure may be described with reference to accompanying drawings. However, those of ordinary skill in the art will understand that the disclosure is not limited to a specific embodiment, and modifications, equivalents, and/or alternatives on the various embodiments described herein can be variously made without departing from the scope and spirit of the disclosure. With regard to description of drawings, similar elements may be marked by similar reference numerals.

FIG. 1 illustrates an operating environment of a display system, according to an embodiment.

Referring to FIG. 1, a display system 100 may be placed in an open space such as a stadium 200. Although FIG. 1 illustrates that the display system 100 is placed in the stadium 200, the display system 100 may be placed in various places, such as building rooftops or theaters, in which many people is able to watch the display system 100, in addition to the stadium 200. According to an embodiment, the display system 100 may output content. For example, when the display system 100 is placed in the stadium 200, such as a baseball stadium, the display system 100 may output a score, a position, and a list of players during a game, and may output a commercial between innings. As the display system 100 outputs content, the visitors naturally watch the commercial, and a commercial provider may obtain enormous advertisement effects. Meanwhile, a stadium operator may obtain the admission fee by providing the game screen to the visitors through the display system 100. In addition, the stadium operator may create operating profits by receiving commercial fees from the commercial provider.

According to a comparative example, the display system may erroneously recognize content as being output through the display device, even though the content is actually not output because of identifying the defect on the display device (e.g., electronic signboard) based on metadata or log-on information. For example, the display system may erroneously recognize the content as being output through the display device even though the content is not output because the display device is broken. Accordingly, visitors or citizens may not watch normal content and the commercial effect to be obtained by the commercial provider may be reduced.

The display system 100 disclosed in the disclosure may detect a defect on the display device. For example, the display system 100 may generate a plurality of error patterns which is able to occur in first content based on the first content provided by the commercial provider. The display system 100 compares (e.g., convolution) the generated error patterns with second content actually photographed by the display system 100 to determine whether at least one of the generated error patterns is preset in the second content. As a result of the determination, when at least one of the generated error patterns is present in the second content, the display system 100 may determine that a defect is present on the display device (or an electronic signboard). Accordingly, the display system 100 may exactly sense whether the defect is present on the display device (or an electronic signboard).

Figure 2:
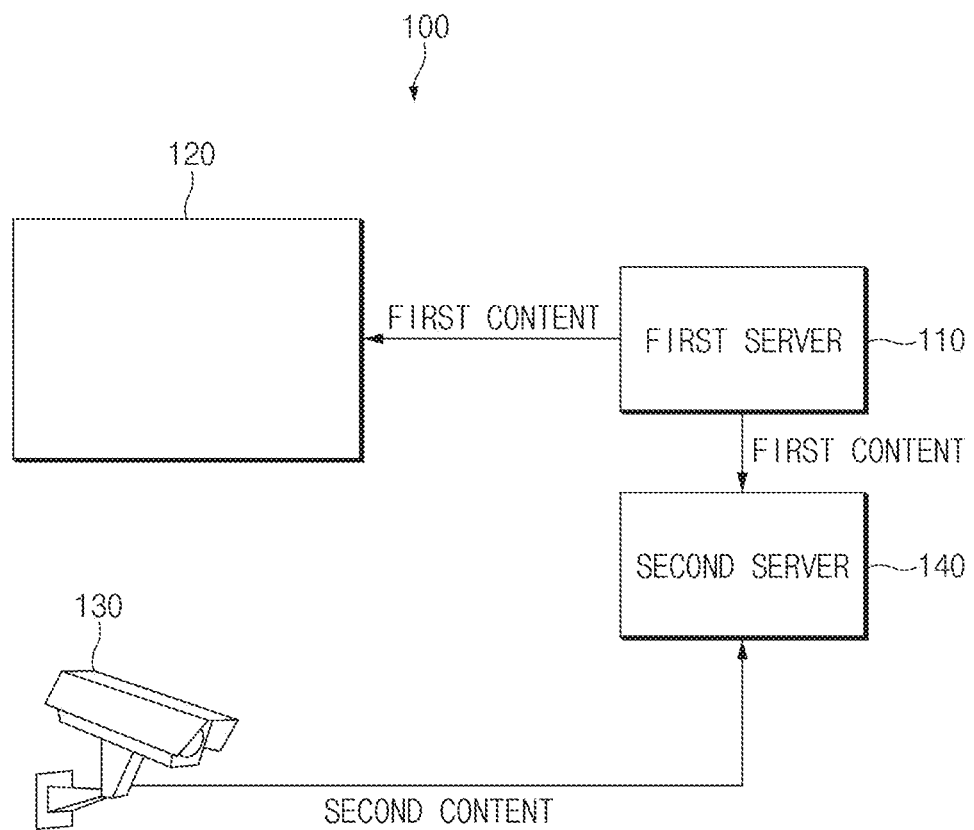
FIG. 2 illustrates a block diagram of a display system, according to an embodiment.

FIG. 2 illustrates the cross-sectional view of the display system 100 according to an embodiment. FIG. 2 is a block diagram illustrating hardware components included in the display system 100 illustrated in FIG. 1.

Referring to FIG. 2, the display system 100 may include a first server 110, a display device 120, a photographing device 130, and a second server 140. Although FIG. 2 illustrates that the first server 110 is separated from the second server 140, the first server 110 and the second server 140 may be provided in the form of one component. In addition, according to various embodiments in the disclosure, some of components illustrated in FIG. 2 may not be illustrated, and components not illustrated in FIG. 2 may be further included.

The first server 110 may be connected with the display device 120 through a wired or wireless manner. The first server 110 may be placed together with the display device 120 or may be present in the form of a cloud server.

According to an embodiment, the first server 110 may transmit the first content to the display device 120. The first content, which is content provided by the commercial provider, may refer to, for example, original data and commercial data.

The display device 120 may output the first content received from the first server 110. When a defect is absent on the display device 120, the first content may be output through the display device 120 without change. However, when a defect is present on the display device 120, content different from the first content may be output. For example, a portion of the commercial screen may be lost or the commercial may not be reproduced.

The photographing device 130 may transmit second content to the second server 140. The second content, which is data obtained as the photographing device 130 photographs the display device 120, may not have error patterns when a defect is absent on the display device 120. However, when the defect is present on the display device 120, at least any one of the error patterns may be present in the second content. In the disclosure, the photographing device 130 may be referred to as a closed circuit television (CCTV).

The second server 140 may be connected with the first server 110 through a wired or wireless manner. The second server 140 may be placed together with the first server 110 or may be present in the form of a cloud server. According to an embodiment, the second server 140 may receive the first content from the first server 110.

According to an embodiment, the second server 140 may generate a plurality of error patterns, which may be present in the first content, based on the first content. For example, the second server 140 may generate the plurality of error patterns using a convolution neural network (CNN). The generated plurality of error patterns may be stored in the second server 140.

According to an embodiment, the second server 140 may determine whether a defect is present on the display device 120, by comparing (e.g., convolution) the second content with the plurality of error patterns. For example, when a partial area of the display device 120 is broken, the error pattern present in the second content may correspond to any one of the plurality of error patterns. When the error pattern present in the second content is identical to at least any one of the plurality of error patterns, the second server 140 may determine that the defect is present on the display device 120.

Figure 3:
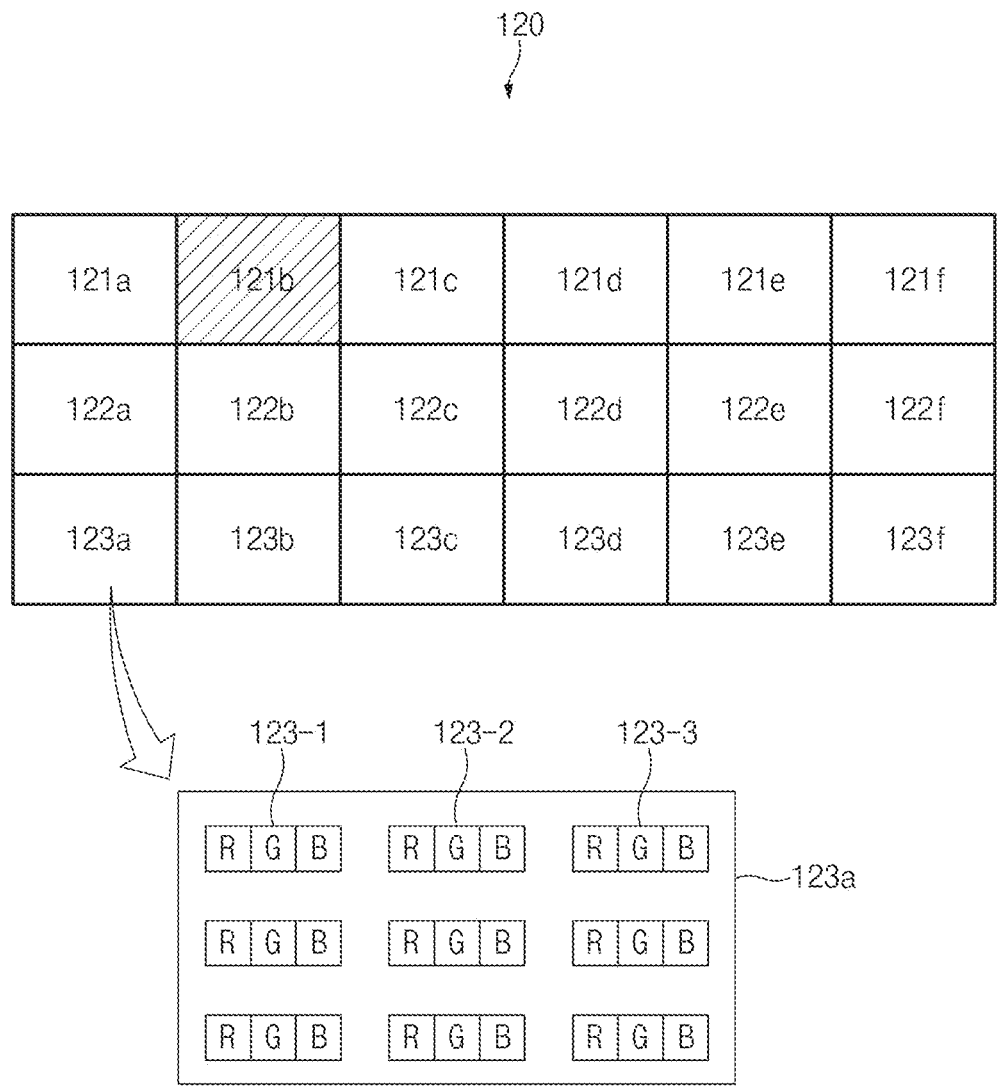
FIG. 3 illustrates a display device, according to an embodiment.

FIG. 3 illustrates the display device 120, according to an embodiment.

Referring to FIG. 3, the display device 120 may include a plurality of displays 121a to 121f, 122a to 122f, and 123a to 123f. For example, the display device 120 may be formed by combining 18 displays 121a to 121f, 122a to 122f, and 123a to 123f. Although FIG. 3 illustrates that the display device 120 includes 18 displays 121a to 121f, 122a to 122f, and 123a to 123f, the display device 120 may include the combination of at least 18 displays. In the disclosure, the display device 120 may be referred to as a "large-size display".

Each of the displays 121a to 121f, 122a to 122f, and 123a to 123f outputs some of the first content. For example, the screen output from each of the displays 121a to 121f, 122a to 122f, and 123a to 123f may form the first content. According to an embodiment, when a defect is present in at least any one of the displays 121a to 121f, 122a to 122f, and 123a to 123f, some of the first content may not output from the display having the defect.

For example, when the defect is present in the first display 121b, an error pattern may be present in the second content. The error pattern present in the second content may be any one of the plurality of error patterns obtained from the first content. Accordingly, the second server 140 may determine that the defect is present on the display device 120.

According to an embodiment, the displays 121a to 121f, 122a to 122f, and 123a to 123f may include a plurality of pixels 123-1, 123-2, and 123-3, and each of the plurality of pixels 123-1, 123-2, and 123-3 may include a plurality of sub-pixels R, G, and B. For example, the plurality of pixels 123-1, 123-2, and 123-3 may be aligned on the second display 123*a* while being spaced apart from each other by a specific distance. Each of the pixels 123-1, 123-2, and 123-3 may include a red sub-pixel R, a green sub-pixel G, and a blue sub-pixel B. The description about the second display 123*a* may be applied to remaining displays 121*a*, 121*c* to 121*f*, 122*a* to 122*f*, and 123*a* to 123*f*, and various embodiments of the disclosure are not limited to that illustrated in FIG. 3. In the disclosure, the pixels 123-1, 123-2, and 123-3 may be referred to as an LED module.

According to an embodiment, although FIG. 3 illustrates that the display device 120 includes a plurality of displays 121*a* to 121*f*, 122*a* to 122*f*, or 123*a* to 123*f*, the display device 120 may be implemented in the form of one large-size display.

Figure 4:
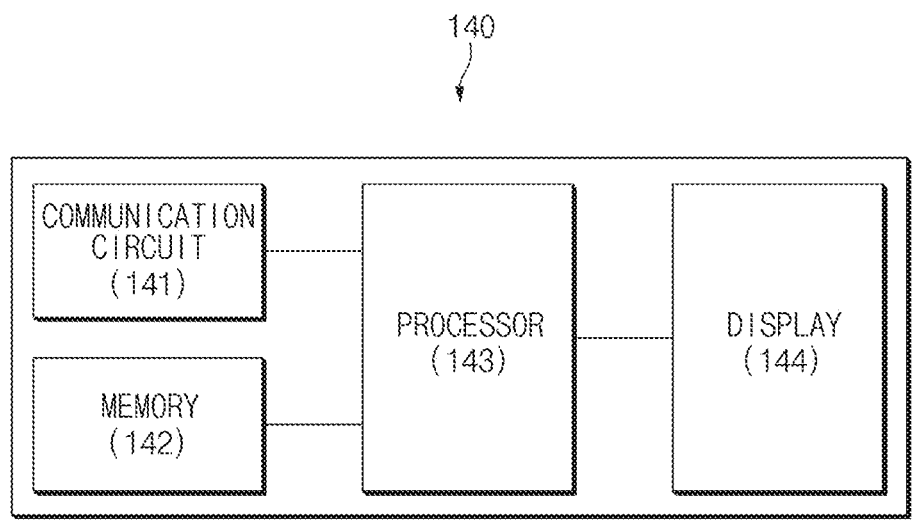
FIG. 4 is a block diagram illustrating a second server, according to an embodiment

FIG. 4 is a block diagram illustrating the second server, according to an embodiment. FIG. 4 is a block diagram illustrating hardware components included in the second server 140 illustrated in FIG. 2.

Referring to FIG. 4, the second server 140 may include a communication circuit 141, a memory 142, a processor 143, and a display 144.

The communication circuit 141 may receive the first content from the first server 110 or the second content from the photographing device 130.

The memory 142 may store the first content and/or the second content. According to an embodiment, the memory 142 may store a plurality of error patterns obtained from the first content.

The processor 143 may generate the plurality of error patterns which may be present in the first content based on the first content received from the first server 110. For example, the processor 143 may generate the plurality of error patterns using a convolution neural network (CNN). The plurality of error patterns may be stored in the memory 142.

According to an embodiment, the processor 143 may determine whether a defect is present on the display device 120, by comparing (e.g., convolution) the second content with the plurality of error patterns. For example, when a partial area of the display device 120 is broken, the error pattern present in the second content may correspond to any one of the plurality of error patterns stored in the memory 142. Accordingly, the processor 143 may determine that the defect is present on the display device 120.

The display 144 may output a defect state on the display device 120. The display 144 may output the defect state while distinguishing among displays (e.g., reference numeral 121*b*), which have defects, of the plurality of displays 121*a* to 121*f*, 122*a* to 122*f*, or 123*a* to 123*f* included in the display device 120, and displays 121*a*, 121*c* to 121*f*, 122*a* to 122*f*, or 123*a* to 123*f* having no defect.

Figure 5:
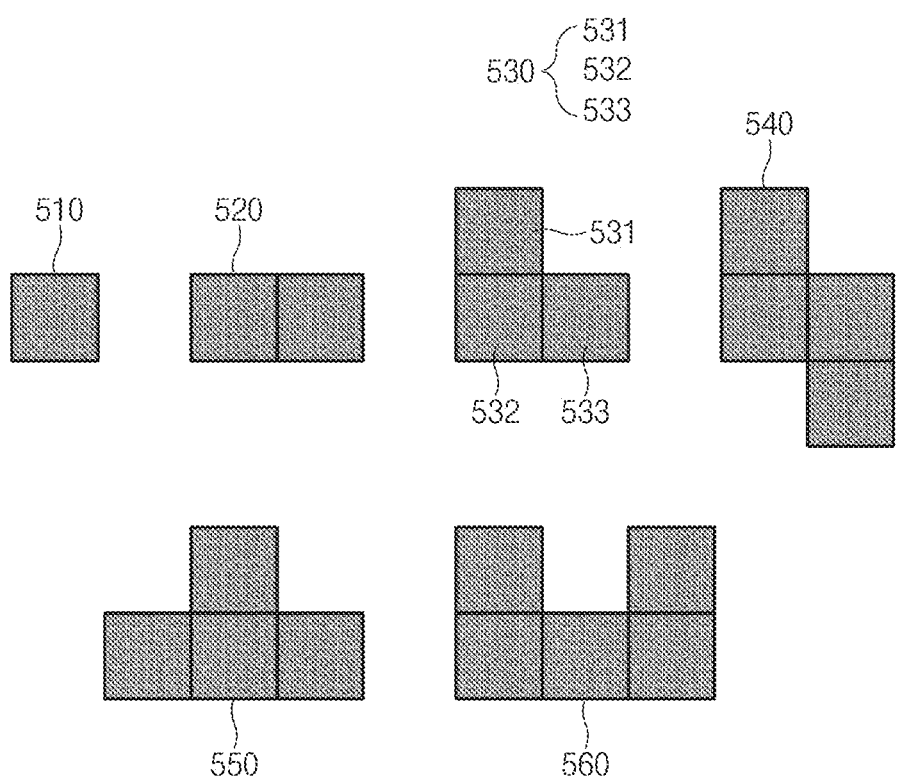
FIG. 5 illustrates a plurality of error patterns, according to various embodiments.

FIG. 5 illustrates a plurality of error patterns, according to various embodiments of the disclosure.

Referring to FIG. 5, the second server 140 may obtain a plurality of error patterns 510, 520, 530, 540, 550, and 560, based on the first content received from the first server 110. The plurality of error patterns 510, 520, 530, 540, 550, and 560 may be six patterns 510, 520, 530, 540, 550, and 560 as illustrated in FIG. 5. In other words, the shape of the defect, which may be present on the display device 120, may be any one of six patterns 510, 520, 530, 540, 550, and 560 as illustrated in FIG. 5.

According to an embodiment, the error patterns 510, 520, 530, 540, 550, and 560 may include at least one cabinet. For example, the third error pattern 530 may include a first cabinet 531, a second cabinet 532, and a third cabinet 533. The number of cabinets included in one error pattern is not limited, four cabinets may be included as in the fourth error pattern 540 and the fifth error pattern 550, and the five cabinets may be included as in the sixth error pattern 560

One cabinet may include at least one pixel (e.g., reference numeral 123-1, 123-2, and 123-3 of FIG. 3). For example, one cabinet may contain about six to eight pixels. In other words, the plurality of pixels may form a cabinet, and the plurality of cabinets may form a display (e.g., the second display 123*a* of FIG. 3).

In the following description using the third error pattern 530, the first cabinet 531, the second cabinet 532, and the third cabinet 533 may form the second display 123*a* of FIG. 3. In this case, when the third error pattern 530 is present in the second content, the second server 140 may determine that a defect is present on the second display 123*a*.

In the disclosure, the description about the third error pattern 530 may be applied to the first error pattern 510, the second error pattern 520, the fourth error pattern 540, the fifth error pattern 550, and the sixth error pattern 560, and the description made with reference to FIG. 5 may be identically applied to components having the same reference numerals as error patterns 510, 520, 530, 540, 550, and 560. In addition, embodiments illustrated in FIG. 5 are provided for the illustrative purpose, but are not limited to things illustrated in FIG. 5.

Figure 6:
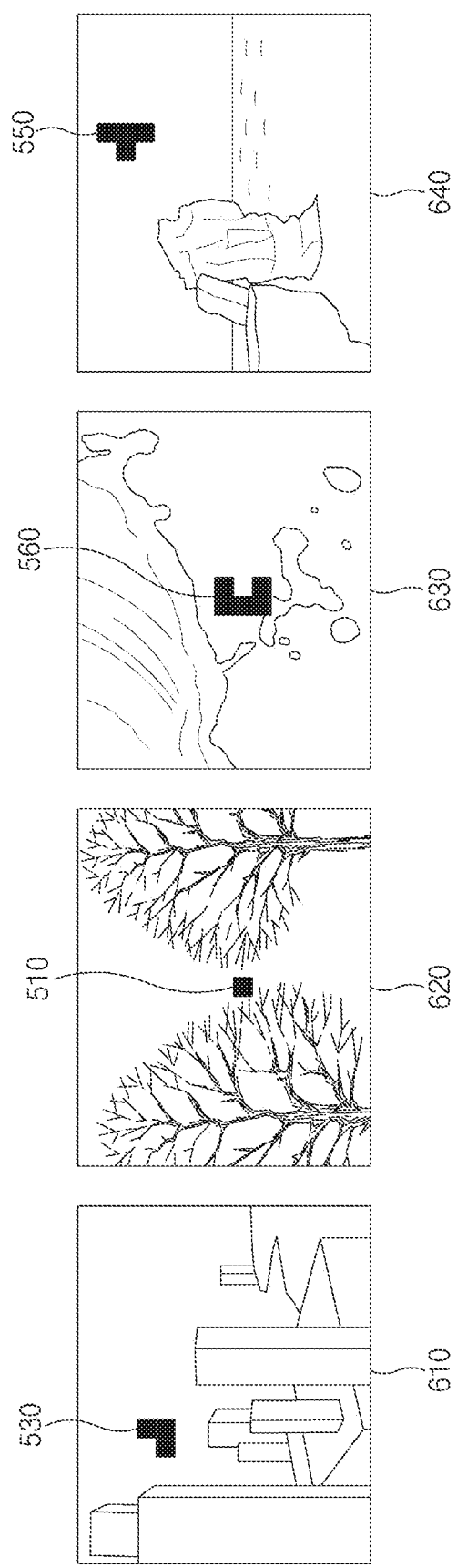
FIG. 6 is a view illustrating an aspect of determining whether a defect is present on the display device, according to various embodiments.

FIG. 6 is a view illustrating an aspect of determining whether a defect is present on the display device, according to various embodiments. Contents 610, 620, 630, and 640 illustrated in FIG. 6 may be second content obtained as the photographing device 130 photographs the display device 120.

Referring to FIG. 6, the second server 140 may compare (e.g., convolution) the second content with the plurality of error patterns 510, 520, 530, 540, 550, and 560. For example, the second server 140 may compare (2-1)th content with the plurality of error patterns 510, 520, 530, 540, 550, and 560. According to the comparison result, the third error pattern 530 may be positioned on the (2-1)th content. Accordingly, the second server 140 may determine that displays, which correspond to the third error pattern 530, of the display device 120 have defects.

According to another embodiment, the second server 140 may perform comparison (e.g., convolution) with respect to (2-2)th content and a plurality of error patterns 510, 520, 530, 540, 550, and 560. According to the comparison result, the first error pattern 510 may be positioned on the (2-2)th content 620. Accordingly, the second server 140 may determine that displays, which correspond to the first error pattern 510, of the display device 120 have defects.

According to another embodiment, the second server 140 may perform comparison (e.g., convolution) with respect to (2-3)th content 630 and the plurality of error patterns 510, 520, 530, 540, 550, and 560. According to the comparison result, the sixth error pattern 560 may be positioned on the (2-3)th content 630. Accordingly, the second server 140 may determine that displays, which correspond to the sixth error pattern 560, of the display device 120 have defects.

According to another embodiment, the second server 140 may perform comparison (e.g., convolution) with respect to (2-4)th content 640 and the plurality of error patterns 510, 520, 530, 540, 550, and 560. According to the comparison result, the fifth error pattern 550 may be positioned on the (2-4)th content 640. Accordingly, the second server 140 may determine that displays, which correspond to the fifth error pattern 550, of the display device 120 have defects.

Figure 7:
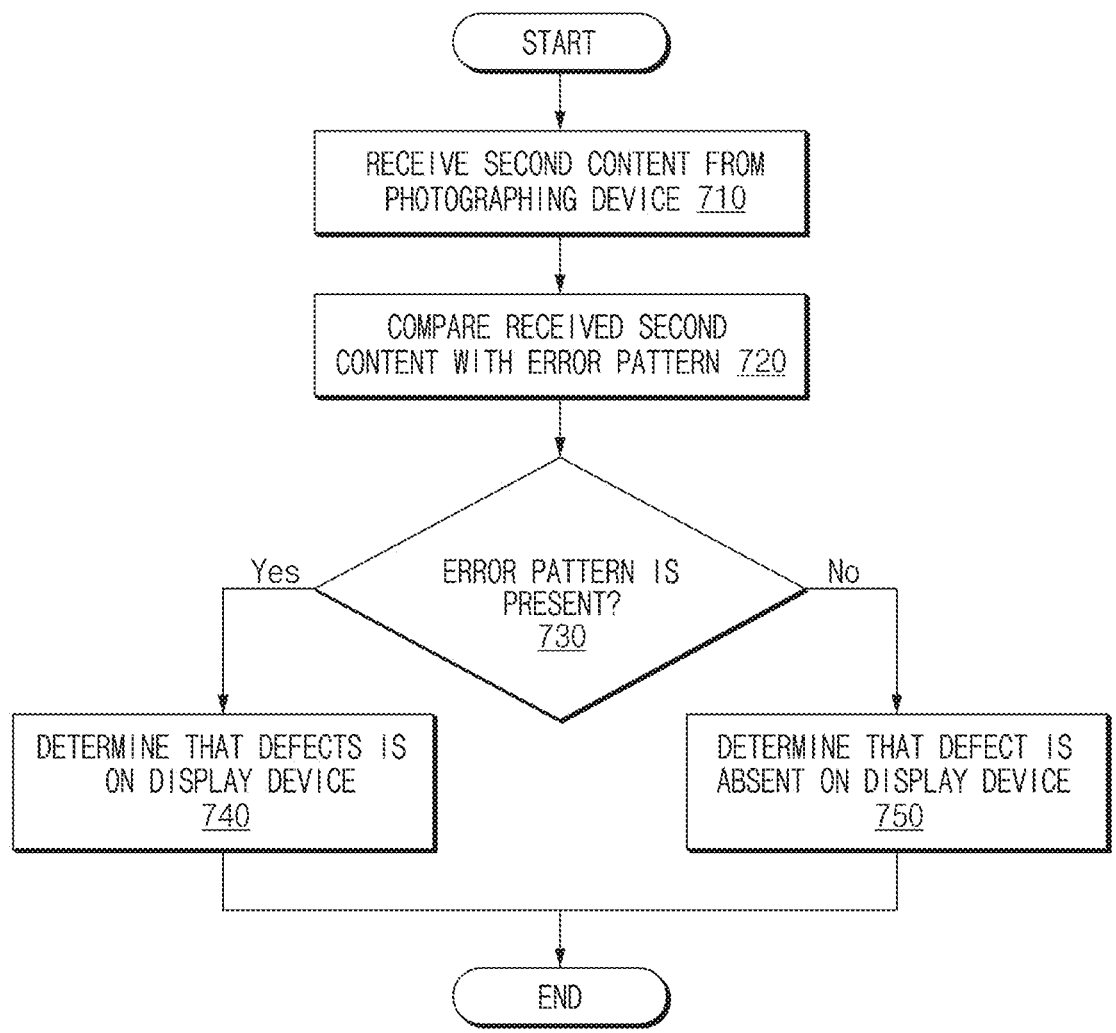
FIG. 7 is a flowchart illustrating the operation of the second server, according to an embodiment.

FIG. 7 is a flowchart illustrating the operation of the second server, according to an embodiment. FIG. 7 is a view illustrating the sequence of operations of the second server 140 illustrated in FIG. 4 in detail.

Referring to FIG. 7, in operation 710, the second content may be received from the photographing device 130. The second content received from the photographing device 130 may be stored in the memory 142.

In operation 720, the second server 140 may perform comparison (e.g., convolution) with respect to the second content received from the photographing device 130 and the plurality of error patterns 510, 520, 530, 540, 550, and 560 stored in the memory 142.

In operation 730, the second server 140 may determine whether at least one of the plurality of error patterns 510, 520, 530, 540, 550, and 560 is present on the second content. As the determination result, when at least one of the plurality of error patterns 510, 520, 530, 540, 550, and 560 is present on the second content, operation 740 may be performed. Otherwise, when any one of the plurality of error patterns 510, 520, 530, 540, 550, and 560 is absent on the second content, operation 750 may be performed.

In operation 740, the second server 140 may determine that the defect is present on the display device 120. Accordingly, the second server 140 may determine that displays, which correspond to the error pattern, of the display device 120 have the defect.

In operation 750, the second server 140 may determine whether a defect is absent on the display device 120. According to an embodiment, the determination results of operations 740 and 750 may be output through the display 144.

Figure 8:
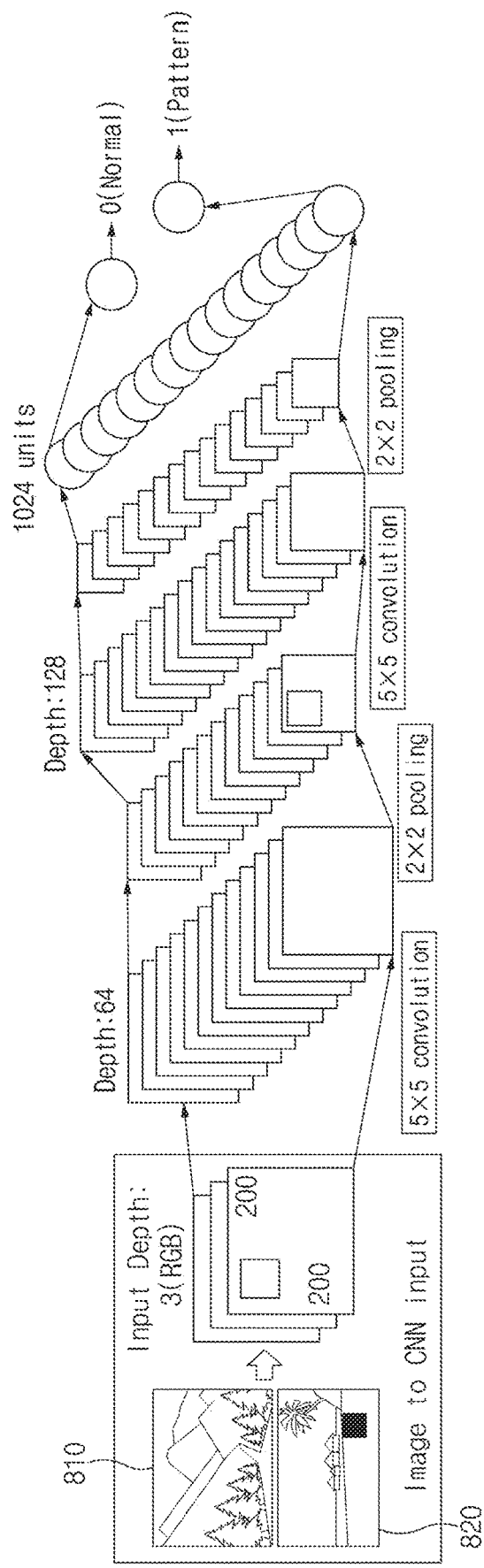
FIG. 8 illustrates an aspect that the second server generates a plurality of error patterns.

FIG. 8 illustrates an aspect that the second server generates a plurality of error patterns.

Referring to FIG. 8, the second server 140 may receive the first content from the first server 110. For example, the second server 140 may receive first content 810 having no error pattern and first content 820 having an error pattern.

The second server 140 may generate the plurality of error patterns 510, 520, 530, 540, 550, and 560 by performing convolution and pooling with respect to the first content 810 having no error pattern and the first content 820 having an error pattern. The pooling may refer to an operation of calculating a mean value of feature values in a partial area and integrating the feature values. The convolution and the pooling may be repeated multiple times, and the number of times that the convolution and the pooling are repeated is not limited to the specific number of times.

According to an embodiment, the error patterns 510, 520, 530, 540, 550, and 560 generated through the convolution and the pooling operations may be stored in the second server 140.

The display device according to various embodiments disclosed in the disclosure may be various types of devices. The display device may include, for example, a portable communication device (e.g., a smartphone), a computer device, a portable multimedia device, a mobile medical appliance, a camera, a wearable device, or a home appliance. The display device according to an embodiment of the disclosure should not be limited to the above-mentioned devices.

It should be understood that various embodiments of the disclosure and terms used in the embodiments do not intend to limit technical features disclosed in the disclosure to a specific embodiment disclosed herein; rather, the disclosure should be construed to cover various modifications, equivalents, or alternatives of embodiments of the disclosure. With regard to the description of drawings, similar or related components may be assigned with similar reference numerals. As used herein, singular forms of noun corresponding to an item may include one or more items unless the context clearly indicates otherwise.

In the disclosure disclosed herein, each of the wordings "A or B", "at least one of A and B", "at least one of A or B", "A, B, or C", "at least one of A, B, and C", or "at least one of A, B, or C", and the like used herein may include any one and all combinations of items arranged together in a relevant wording of the wordings. The expressions, such as "a first", "a second", "the first", or "the second", may be used merely for the purpose of distinguishing a component from another component, but do not limit the corresponding component in other aspect (e.g., the importance or the order). It is to be understood that if a component (e.g., a first component) is referred to, with or without the term "operatively" or "communicatively", as "coupled with," "coupled to," "connected with," or "connected to" the another component (e.g., a second component), it means that the component may be coupled with the another component directly (e.g., wiredly), wirelessly, or via a third component.

The term "module" used in the disclosure may include a unit implemented in hardware, software, or firmware and may be, for example, interchangeably used with the terms "logic", "logical block", "part" and "circuit". The "module" may be a minimum unit of an integrated part or may be a part thereof. The "module" may be an integral-type part, a minimum unit, which performs one or more functions, of the part, or a portion thereof. For example, according to an embodiment, the "module" may be implemented in the form of an application-specific integrated circuit (ASIC).

Various embodiments of the disclosure may be implemented by software (e.g., the program 140) including an instruction stored in a storage medium (e.g., an internal memory 136 or an external memory 138) readable by a machine (e.g., the electronic device 101). For example, the processor (e.g., the processor 120) of a machine (e.g., the electronic device 101) may call at least one instruction of stored instructions from the storage medium and execute the called instruction. This allows the machine to run to perform at least one function according to the at least one instruction, which is called. The one or more instructions may include a code generated by a compiler or a code executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

According to an embodiment, the method according to various embodiments disclosed in the disclosure may be provided as a part of a computer program product. The computer program product may be traded as goods between a seller and a buyer. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

According to embodiments of the disclosure, the defect on the large-scale display may be sensed.

Besides, a variety of effects directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A display system comprising:
a display device including a plurality of displays and configured to display first content received from a first server;
a second server configured to receive the first content from the first server and to store a plurality of error patterns of the first content;
a photographing device configured to transmit second content obtained by photographing the display device to the second server, and
wherein the second server is further configured to display whether a defect is present on the display device, by comparing the second content with the stored plurality of error patterns, when the second content is received from the photographing device,
wherein the first content includes first content having an error pattern and first content having no error pattern; and
the second server is further configured to process, through a specified synthesis manner, the first content having the error pattern and the first content having no error pattern, to generate the plurality of error patterns.

2. The display system of claim 1, wherein the plurality of error patterns include error patterns provided in a specified number.

3. The display system of claim 1, wherein the second server generates the plurality of error patterns using a convolution neural network (CNN).

4. The display system of claim 1, wherein images displayed from the display device forms the first content.

5. The display system of claim 1, wherein the second server is configured to display whether the defect is present on the display device, through a second server display.

6. The display system of claim 5, wherein the second server is configured to display whether the defect is present on the display device, through the second server display, such that displays, which have defects, of the plurality of displays are distinguished from displays, of the plurality of displays, having no defect.

7. The display system of claim 1, wherein the number of the plurality of displays is at least 18.

8. The display system of claim 1, wherein the plurality of displays include a plurality of pixels, and
wherein each of the plurality of pixels includes a plurality of sub-pixels.

9. The display system of claim 1, wherein each of the plurality of error patterns includes information on a defect on at least one of the plurality of displays.

10. A server comprising:
a display;
a communication circuit configured to receive first content from an external server and to receive second content from a photographing device;
a processor configured to generate a plurality of error patterns of the first content; and
a memory configured to store the plurality of error patterns,
wherein the processor is further configured to:
determine whether a defect is present on a display device, by comparing the received second content, which is obtained by the photographing device photographing the display device, with the stored plurality of error patterns; and
control the display to display a result of the determination,
wherein the first content includes first content having an error pattern and first content having no error pattern; and
wherein the processor is further configured to process, through a specified synthesis manner, the first content having the error pattern and the first content having no error pattern to generate the plurality of error patterns.

11. The server of claim 10, wherein the plurality of error patterns include error patterns provided in a specified number.

12. The server of claim 10, wherein the processor generates the plurality of error patterns using a convolution neural network (CNN).

13. The server of claim 10, wherein the display device includes a plurality of displays, and
the processor is configured to control the display to display whether the defect is present on the external display device, such that displays, which have defects, of the plurality of displays are distinguished from displays, of the plurality of displays, having no defect.

14. The server of claim 10, wherein each of the plurality of error patterns includes information on a defect on at least one of a plurality of displays included in the external display device.

15. A method for detecting a defect on a display device, the method comprising:
receiving first content from a server and receiving second content from a photographing device, wherein the first content includes first content having an error pattern and first content having no error pattern;
processing, through a specified synthesis manner, the first content having the error pattern and the first content having no error pattern to generate a plurality of error patterns of the first content;
determining whether the defect is present on the display device by comparing the received second content, which is obtained by the photographing device photographing the display device, with the generated plurality of error patterns; and displaying a result of the determination.

16. The method of claim 15, wherein the plurality of error patterns includes error patterns provided in a specified number.

\* \* \* \* \*